United States Patent [19]
Yamaguchi et al.

[11] Patent Number: 5,701,949
[45] Date of Patent: Dec. 30, 1997

[54] AIR CONDITIONER FOR AN AUTOMOBILE

[75] Inventors: Hiroyuki Yamaguchi, Aichi-gun; Masayuki Naito, Nagoya; Satoshi Inayoshi, Hekinan; Nobuyuki Doi; Kazunori Saida, both of Kariya; Yasuhiko Sumiya, Hekinan, all of Japan

[73] Assignee: Nippondenso Co., Ltd., Kariya, Japan

[21] Appl. No.: 624,837

[22] Filed: Mar. 22, 1996

[30] Foreign Application Priority Data

| Mar. 23, 1995 | [JP] | Japan | 7-064116 |
| Apr. 11, 1995 | [JP] | Japan | 7-085755 |
| Apr. 17, 1995 | [JP] | Japan | 7-091088 |
| Apr. 24, 1995 | [JP] | Japan | 7-098868 |

[51] Int. Cl.$^6$ ............... F25B 29/00; B60H 1/00
[52] U.S. Cl. ............... 165/42; 16/43; 16/103; 454/69; 251/175; 251/901; 137/872; 237/12.3 A
[58] Field of Search .................. 165/42, 43, 103; 137/872, 625.33; 251/901, 175, 356, 333; 454/69; 237/12.3 A, 12.3 B

[56] References Cited

U.S. PATENT DOCUMENTS

| 2,101,991 | 12/1937 | Finley et al. | 251/175 |
| 3,381,706 | 5/1968 | Hendly | 251/901 |
| 4,084,616 | 4/1978 | Tragert | 251/901 |
| 4,164,211 | 8/1979 | Onnen | 251/175 |
| 4,546,617 | 10/1985 | Suzuki et al. | 165/43 |
| 5,062,473 | 11/1991 | Ostrand et al. | 165/43 |
| 5,105,730 | 4/1992 | Smith | 251/901 |
| 5,162,020 | 11/1992 | Asano et al. | 165/103 |
| 5,551,667 | 9/1996 | Galka et al. | 454/69 |

FOREIGN PATENT DOCUMENTS

| 449205 A1 | 3/1991 | European Pat. Off. |
| 681934A1 | 11/1995 | European Pat. Off. |
| 62-80438 | of 1987 | Japan |
| 63-180512 | of 1988 | Japan |
| 1-172014 | 7/1989 | Japan |
| 1-15508 U | 1/1990 | Japan |
| 4-257720 | of 1992 | Japan |
| 6-71222 U | 10/1994 | Japan |
| 1154664 | 6/1969 | United Kingdom |

OTHER PUBLICATIONS

Takahiro Tokunaga, "*Blowing Port Switching Mechanism of Air Conditioning Device for Use in Vehicle*", Journal of Nippondenso Technical Disclosure, Published Feb. 15, 1990, No. 70–025.

U.S. application No. 08/620,582 filed Mar. 22, 1996.
U.S. application No. 08/620,609 filed Mar. 22, 1996.
U.S. application No. 08/633,082 filed Apr. 18, 1996.

*Primary Examiner*—John K. Ford
*Attorney, Agent, or Firm*—Harness, Dickey & Pierce

[57] ABSTRACT

According to the present invention, in an automotive air conditioner system, a link mechanism is provided by using a cool air passage provided in parallel with a warm air passage and a cool air/heated air mixing chamber provided at a downstream side of the warm air passage and the cool air passage. The clearance between a sliding door and a cooler can be set to a minimum distance as required. Further, it is not necessary to ensure a space for installing the link mechanism outside the case of the air conditioner. As a result, the size of the air conditioning unit including the sliding door can be effectively reduced.

6 Claims, 14 Drawing Sheets

→ AMOUNT OF ROTATION OF
    LEVER MEMBER 35

→ AMOUNT OF OPERATION OF
    TEMPERATURE CONTROL LEVER (%)

AIR CONDITIONER FOR AN AUTOMOBILE

CROSS REFERENCE TO RELATED APPLICATIONS

This application is based on and claims priority of Japanese Patent Applications No. Hei 7-64116, filed on Mar. 23, 1995, No. Hei 7-85755, filed on April 11, 1995, No. Hei 7-91088, filed on Apr. 17, 1995, and No. Hei 7-98868, filed on Apr. 24, 1995, the content of which are incorporated herein by reference.

BACKGROUND OF THE INVENTION

1. Field of the Invention

The present invention relates to an automotive air conditioner for controlling the ratio in air flow between an air passage to a heater and a cool air passage by using a sliding door slidable in a direction crossing the air passage to the heater and the cool air passage.

2. Description of Related Art

An automotive air conditioner having a sliding door has conventionally been proposed in Japanese Patent Laid-open No. 1-172014, for example. In such a conventional air conditioner, a link mechanism for driving the sliding door is provided between the sliding door and a cooler (evaporator) located upstream from the sliding door. The sliding door is slidably driven by transmitting an operating force from an electric motor or the like to the link mechanism.

As mentioned above, the link mechanism for driving the sliding door is provided between the sliding door and the cooler. Accordingly, a large clearance must be set between the sliding door and the cooler in order to avoid interference between the cooler and parts of the link mechanisms, causing an increase in size of an air conditioning unit.

Further, in the automotive air conditioner having a sliding door disclosed in Japanese Utility Model Laid-open No. 6-71222 or Japanese Patent Laid-open No. 1-172014, for example, a plurality of sliding doors are used to control the ratio between an air flow to an air passage leading to a heater and an air flow to a cool air passage provided in parallel to the air passage leading to the heater.

Accordingly, a link mechanism for driving the plurality of sliding doors necessarily becomes complicated.

To overcome such a problem, the inventors of the present invention have devised and examined a prototype of an air conditioner having a simple configuration for controlling the ratio in air flow between the air passage to the heater and the cool air passage by using a single sliding door.

In this prototype of the air conditioner examined by the inventors, the amount of movement (the opening degree) of the sliding door changes in one-to-one correspondence with the amount of movement of a link mechanism for driving the sliding door. Therefore, the relation between the amount of movement of the link mechanism and the blowing air temperature to be controlled by the sliding door becomes a linear characteristic as shown by a broken line (1) in FIG. 9.

As a result, even when the link mechanism is slightly moved, the blowing air temperature immediately changes also in a maximum cooling region and a maximum heating region. Therefore, in the case where the sliding door does not reach a maximum cooling position and a maximum heating position due to variation in size of the link mechanism, a maximum cooling capacity and a maximum heating capacity cannot be set in spite of the fact that the sliding door is set to the opposite ends of a movable range thereof.

Furthermore, in the prototype of the air conditioner examined by the inventors, there is a problem in temperature control performance such that when the sliding door is moved in a heating capacity decreasing direction (cool air passage opening direction) from a maximum heating position (cool air passage full-closed position), an amount of the heated airflow rapidly decreases compared with that of a cool air flow, temperature of air blowing into the compartment being thereby decreased.

This problem is caused due to the following reason. In the automotive air conditioner, the cross-sectional area of the cool air passage is designed to be as large as possible in order to ensure a cooling capacity (cool air flow) in a maximum cooling mode. In contrast, a heat exchanger (usually composed of a corrugated fin and a flat tube) of the heater is provided in the air passage to the heater. Accordingly, air flow resistance in the air passage to the heater necessarily becomes larger than that in the cool air passage.

Such an air passage configuration causes the relation that air flow resistance in the cool air passage is small and air flow resistance in the air passage to the heater is large. As a result, when the sliding door is moved in the heating capacity decreasing direction from the maximum heating position, the amount of the heated airflow rapidly becomes smaller than that of the cool airflow.

This problem may be solved by configuring the link mechanism for driving the sliding door so that the amount of movement of the sliding door is made small in response to the amount of movement of the link mechanism. Such a configuration of the link mechanism may be embodied by additionally providing a control link for controlling the amount of movement of the link mechanism outside an air conditioning unit case accommodating the heater, etc. However, parts of the control link are increased, thus causing an increase in both space for the air conditioning unit and cost.

SUMMARY OF THE INVENTION

In view of the above problems, it is a first object of the present invention to provide an automotive air conditioner which can effectively suppress an increase in size of the air conditioning unit due to the link mechanism for driving the sliding door.

Further, it is a second object of the present invention to provide an automotive air conditioner for controlling the ratio in air flow between the air passage to the heater and the cool air passage by using a single sliding door, which air conditioner can reliably set the maximum cooling capacity and the maximum heating capacity irrespective of variation in size of the link mechanism.

Furthermore, it is a third object of the present invention to provide an automotive air conditioner for controlling the ratio in air flow between the air passage to the heater and the cool air passage, which air conditioner can prevent a rapid decrease in heated air flow and improve temperature control performance without additional link parts.

According to a first aspect of the invention, the link mechanism for operating the sliding door is provided in a space leading from the cool air passage to the cool air/warm air mixing chamber. That is, the link mechanism is installed by utilizing the cool air passage provided in parallel to the warm air passage and an the cool air/heated air mixing chamber provided at a downstream side of the warm air passage and the cool air passage.

Accordingly, the clearance between the sliding door and the cooler can be set to a minimum distance as required.

Further, it is not necessary to ensure a space for installing the link mechanism outside the case of the air conditioner. As a result, the air conditioning unit including the sliding door can be effectively downsized.

According to a second aspect of the present invention, a guide mechanism for slidably guiding the sliding door in the crossing direction is provided in such a manner that an amount of operation of the sliding door in the crossing direction is set to be smaller than that of the link mechanism in the crossing direction when the temperature control mechanism is operated in a heating capacity decreasing direction from a maximum heating position. Therefore, when the temperature control mechanism is moved in the heating capacity decreasing direction from the maximum heating position, a rapid decrease in heated air flow can be suppressed to thereby obtain a temperature control characteristic such that the temperature of air blowing into the passenger compartment linearly changes with a change in operational position of the temperature control mechanism.

It is preferable for the above guide mechanism to be a guide groove provided on the case.

Accordingly, temperature control in the passenger compartment by operating a temperature control mechanism can be easily performed.

Further, a temperature control characteristic as necessary can be obtained by specially designing the shape of the guide groove without providing any additional link parts to the link mechanism. Accordingly, it is possible to avoid an increase in air conditioning unit space and an increase in cost due to the increase in link parts. According to this effect and the use of the single sliding door requiring a much smaller operational space, it is possible to provide an automotive air conditioner which is compact, inexpensive, and is superior in temperature control performance.

Further, according to a third aspect of the present invention, the link mechanism for operating the sliding door includes a first lever member provided on the sliding door, a drive shaft provided so as to be rotated by the temperature control mechanism, and a second lever member connected at one end thereof to the drive shaft, the second lever member.

The first lever member is engaged together so that an amount of movement of the first lever member is maintained at substantially zero in response to an amount of movement of the second lever member in a maximum cooling region and a maximum heating region of the temperature control mechanism. Accordingly, even if there are some variations in size of the link mechanism, the temperature control mechanism, etc., the maximum cooling capacity and the maximum heating capacity can be reliably set.

On the other hand, in the intermediate temperature control region, the amount of movement of the first lever member linearly changes with the amount of operation of the temperature control mechanism. As a result, the temperature of the blowing air is linearly controlled, and therefore, it is possible to control the temperature of the blowing air favorably.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENTS

Preferred embodiments of the present invention will now be described with reference to the drawings.

Figure 1:
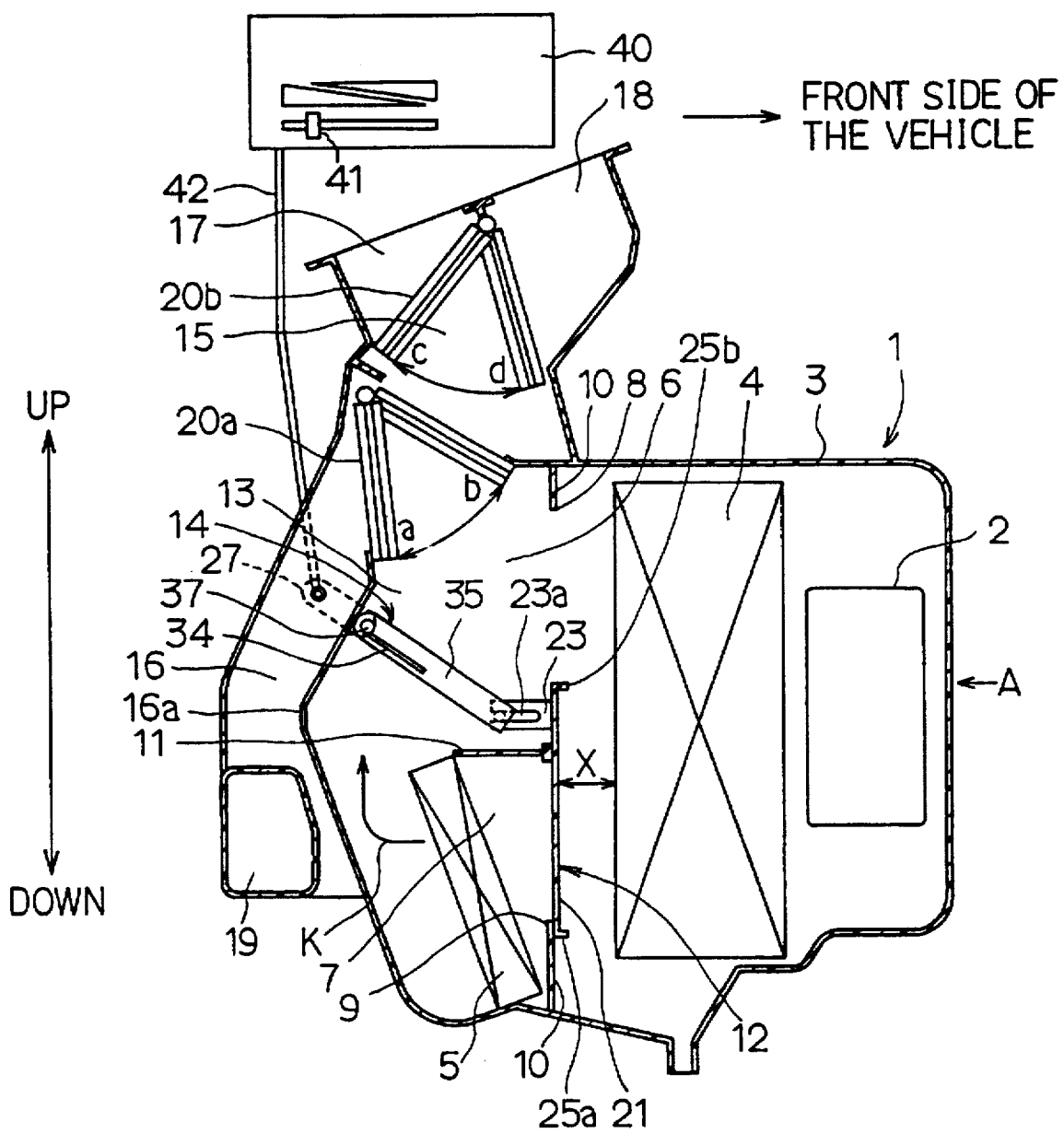
FIG. 1 is a cross-sectional view of the general construction of a first embodiment of the present invention in a maximum cool mode.

Referring to FIG. 1, an air conditioning unit 1 of an air conditioner for an automobile is located below an instrument panel in a passenger compartment, and includes an air inlet opening 2. A blowing unit (not shown) is provided below the instrument panel before a passenger's seat next to the driver's seat to blow air to the air inlet opening 2.

As is known well, the blowing unit includes an inside/outside air selector box for selectively introducing the air inside the compartment (inside air) or the air outside the compartment (outside air), and a centrifugal multi-vane blower.

A resin case 3 of the air conditioning unit 1 is located below the instrument panel at a substantially central position in the lateral direction of the passenger compartment. An evaporator 4 as air cooling means is located at an upstream position in the airflow direction in the case 3, and a heater core 5 as air heating means is located in a lower position on a downstream side in the airflow direction.

Further, a cool air passage 6 for allowing the air cooled by the evaporator 4 to bypass the heater core 5 is formed in the case 3 in an upper position on a downstream side of the evaporator 4 (in a position above the heater core 5).

The evaporator 4 is a cooler forming a refrigerating cycle in combination with a compressor, a condenser, a receiver, and a pressure reducing device (all not shown) as is known, and dehumidifies and cools the air in the case 3. The compressor is driven by an automotive engine via an electromagnetic clutch (not shown). The heater core 5 is a heater using cooling air for the automotive engine as a heat source for reheating the air cooled by the evaporator 4.

At a downstream side of the evaporator 4 in the case 3, there are formed an opening 8 for cool air at the inlet of the cool air passage 6 and an opening 9 for heating at the inlet of a heater passage 7 leading to the heater core 5, for introducing the cool air passed through the evaporator 4.

As shown in FIG. 1, the opening 8 for cool air and the opening 9 for heating open on the same plane, and these openings 8 and 9 are defined by a projection wall 10 projecting from an inside wall of the case 3 and a partition wall 11 located at a substantially central position in the case 3.

The opening 8 for cool air and the opening 9 for heating have substantially rectangular shapes as viewed in the direction of the arrow A in FIG. 1, and these openings 8 and 9 are vertically juxtaposed.

The partition wall 11 horizontally extends from the intermediate position between the two openings 8 and 9 in the downstream direction so as to partition the cool air passage 6 and the passage 7 for heating from each other. Accordingly, the air introduced from the opening 9 for heating into the passage 7 for heating is wholly sent to the heater core 5. Further, the air introduced from the opening 8 for cool air into the cool air passage 6 wholly bypasses the heater core 5.

At a downstream side of the evaporator 4 and an upstream side of the cooler opening 8 and the heater opening 9, there is provided a sliding door 12 for adjusting the amounts of air to be sent to the cool air passage 6 and the passage 7 for heating. The detail of the sliding door 12 will be hereinafter described.

At a downstream of the cool air passage 6 and the passage 7 for heating, there is provided an air mixing chamber portion (a cool air/warm air mixing chamber) 13 for mixing the cool air passed through the cool air passage 6 and the warm air passed through the passage 7 for heating. In the air mixing chamber portion 13, the cool air flowing through the cool air passage 6 and the warm air flowing through the passage 7 for heating are mixed together to thereby obtain a desired temperature of conditioned air.

A link mechanism 14 for operating the sliding door 12 is provided at a position between the cool air passage 6 and the air mixing chamber portion 13 in the space defined in the case 3. The link mechanism 14 also serves to adjust the flow directions of the cool air and the warm air respectively flowing through the cool air passage 6 and the passage 7 for heating. The detail of the link mechanism 14 will be hereinafter described in relation to the sliding door 12.

At a downstream side of the air mixing chamber portion 13 in the case 3, there are formed two branched air outlet passages 15 and 16. As shown in FIG. 1, the passage 15 extends upward. At a downstream side of the passage 15, there are provided a face air outlet passage 17 connected to a face air outlet (not shown) for blowing conditioned air toward the upper half of the body of a passenger in the passenger compartment and a defroster air outlet passage 18 connected to a defroster air outlet (not shown) for blowing conditioned air toward the inside surface of the windshield glass of the vehicle.

On the other hand, the other passage 16 extends downward and is connected at its downstream end to a foot air outlet 19 for blowing conditioned air toward the lower half of the body of the passenger.

At a branched portion between the two passages 15 and 16, there is provided a first selector door 20a for selecting whether the air conditioned in the case 3 is to be sent to the passage 15 or is to be sent to the passage 16. When the first selector door 20a is in a rotational position shown by "a" in FIG. 1, the conditioned air is wholly supplied to the passage 15, whereas when the first selector door 20a is in another rotational position shown by "b" in FIG. 1, the conditioned air is wholly supplied to the passage 16 and blown from the foot air outlet 19.

Further, a second selector door 20b is located just downstream of the passage 15 so as to select whether the conditioned air sent to the passage 15 is to be supplied to the face air outlet passage 17 or is to be supplied to the defroster air outlet passage 18. More specifically, when the first selector door 20a is in the rotational position "a" and the second selector door 20b is in a rotational position shown by "c" in FIG. 1, the conditioned air is supplied to the defroster air outlet passage 18. Conversely, when the first selector door 20a is in the rotational position "a" and the second selector door 20b is in another rotational position shown by "d" in FIG. 1, the conditioned air is supplied to the face air outlet passage 17.

The sliding door 12 and the link mechanism 14 will now be described in detail.

Figure 2:
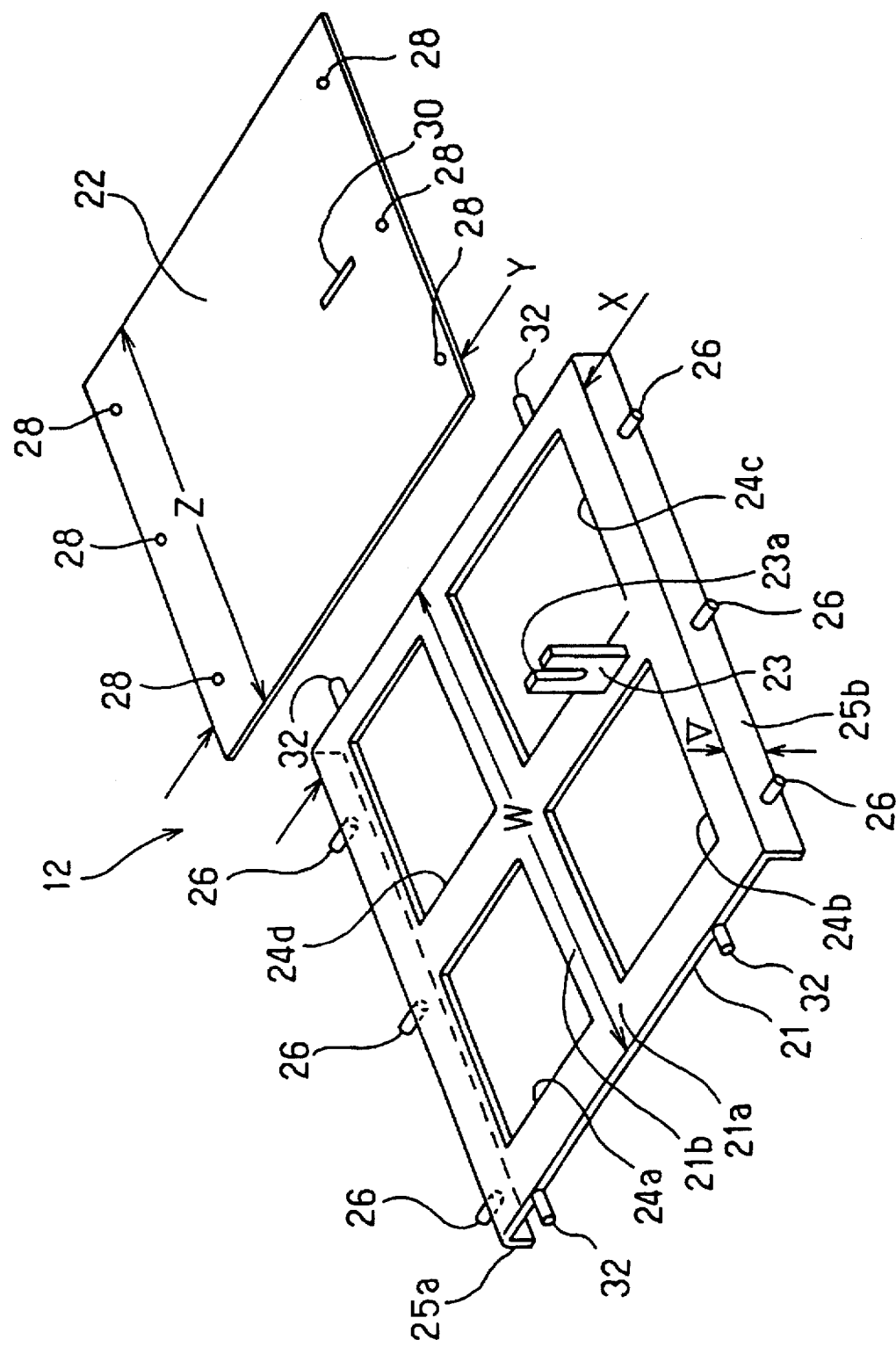
FIG. 2 is an exploded perspective view of a supporting member and a film members of the sliding door in FIG. 1.
Figure 3:
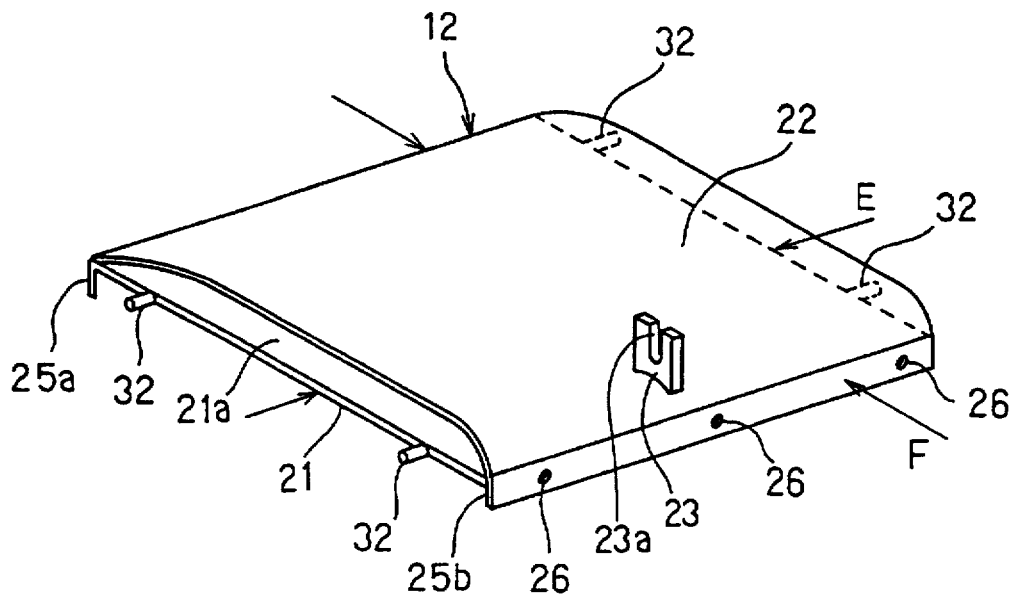
FIG. 3 is a perspective view showing the condition when the supporting and film members in FIG. 2 are installed.
Figure 4:
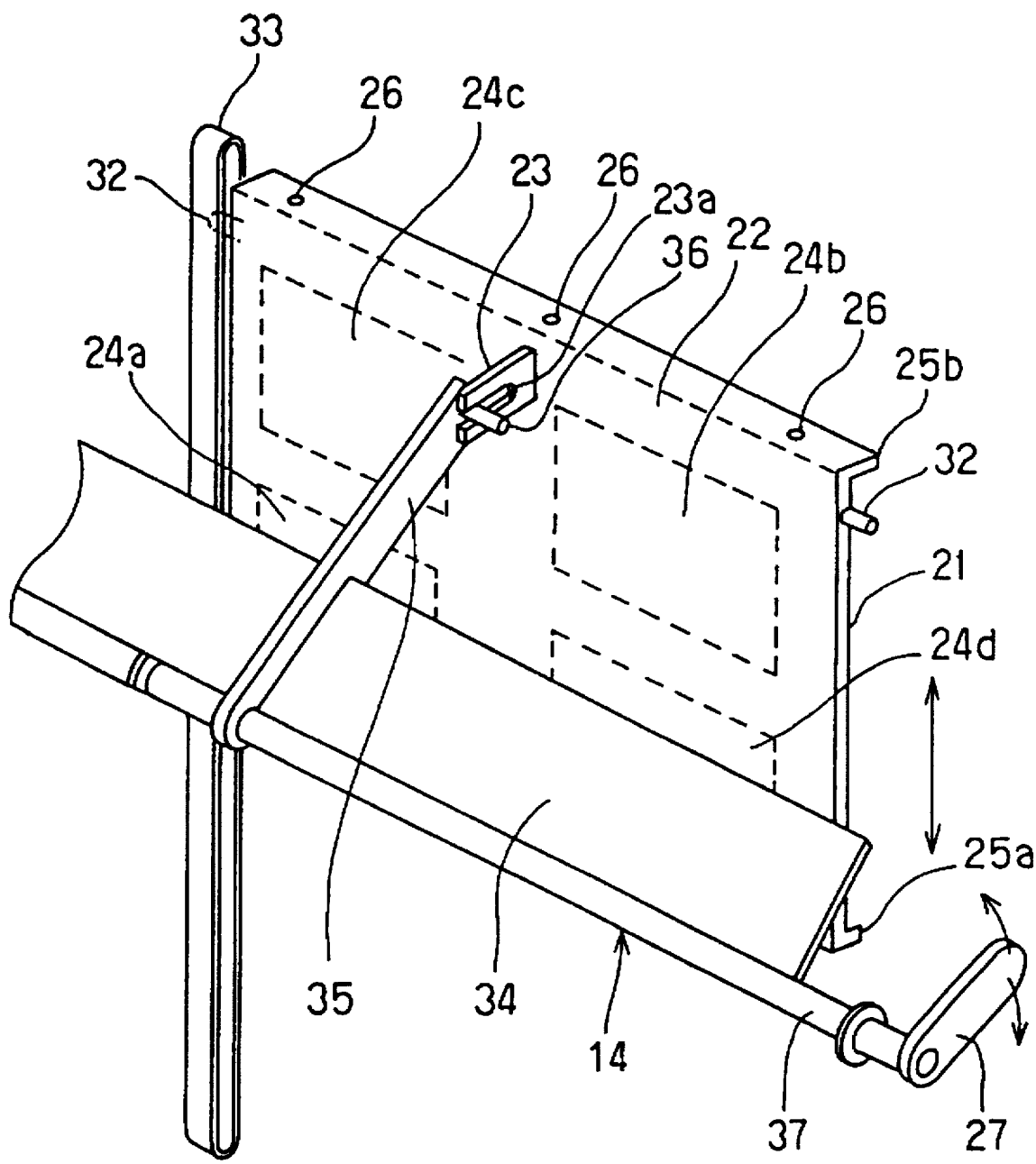
FIG. 4 is a perspective view illustrating the condition when the sliding door shown in FIG. 1 is installed and contained within a case.

FIG. 2 is an exploded perspective view of the sliding door 12. FIG. 3 is a perspective view of the sliding door 12 in an assembled condition. FIG. 4 is a perspective view of the sliding door 12 mounted within the case 3.

The sliding door 12 includes a support member 21 and a film member 22 provided so as to cover one plane portion 21a on the downstream side of the support member 21.

The support member 21 is made of a resin material such as polypropylene, and has a substantially rectangular outer shape. As shown in FIG. 2, the support member 21 is formed with four rectangular through-holes (openings) 24a to 24d, so that the support member 21 is configured like a lattice-shaped framework and has a cross-shaped supporting portion 21b.

The support member 21 is integrally formed with mounting portions 25a and 25b bent substantially perpendicularly from one plane portion 21a at the opposite ends (at the front end and the rear end as viewed in FIG. 2) over the entire lengths thereof. The outer surface of each of the mounting portions 25a and 25b is integrally formed with a plurality of columnar projections 26 arranged at equal intervals. As will be described later, the mounting portions 25a and 25b are provided to mount the film member 22 on the support member 21. As shown in FIGS. 1 and 4, the mounting portions 25a and 25b are respectively formed at the lower end and the upper end of the sliding door 12.

The laterally opposite end surfaces of the support member 21 as viewed in FIG. 2 are integrally formed with a plurality of (two for each end surface) columnar holding portions 32 projecting sidewards from the end surfaces for movably holding the support member 21 within the case 3. Further, a lever member 23 having a U-shaped recess 23a is formed on the upper surface of the supporting portion 21b of the support member 21. As shown in FIG. 1, the lever member 23 is formed so as to project from the plane portion 21a on the downstream side of the support member 21 into the cool air passage 6.

The film member 22 is formed preferably of a resin material having flexibility but no air permeability and having a small frictional resistance. More specifically, the film member 22 is made of a resin film of polyethylene terephthalate having a thickness of 75 µm, for example, and has a substantially rectangular shape.

With regard to the size of the film member 22, the width Z of the film member 22 is equal to the width W of the support member 21. The height Y of the film member 22 is larger by a predetermined length than the sum of the height X of the support member 21 and the total width of the mounting portions 25a and 25b (twice as long as the width "V" shown in FIG. 2).

At each longitudinal end portion of the film member 22, there are formed a plurality of mounting holes 28 arranged at equal intervals which are the same as the intervals of the plural projections 26 formed at each longitudinal end of the support member 21. Further, the film member 22 is formed with an insert hole 30 into which the lever member 23 of the support member 21 is inserted.

When the film member 22 is mounted on the support member 21, the three mounting holes 28 arranged at equal intervals at one end portion of the film member 22 are fitted (or loosely fitted) into the three projections 26 arranged at equal intervals at one end of the support member 21. Thereafter, the lever member 23 of the support member 21 is inserted into the insert hole 30, and the other three mounting holes 28 at the other end of the film member 22 are fitted (or loosely fitted) with the other three projections 26 at the other end of the support member 21. Thereafter, all the projections 26 are melted by using a heating device (not shown), for example, to thereby thermally bond the film member 22 to the mounting portions 25a and 25b of the support member 21. Thus, the film member 22 is fixed to the support member 21 (see FIG. 3).

As mentioned above, the width Z of the film member 22 is so set as to satisfy the relation of Z=W. Therefore, as shown in FIG. 3, the lateral width (the size shown by "E" in FIG. 3) of the film member 22 is equal to that of the support member 21, and the two members 21 and 22 just overlap each other. On the other hand, the longitudinal height (the size shown by "F" in FIG. 3) of the film member 22 is larger than that of the support member 21. Therefore, the film member 22 fixed to the support member 21 is in a flexed condition such that a space is defined between the one plane portion 21a of the support member 21 and the film member 22.

A mounting structure of the support member 21 and the film member 22 within the case 3 will now be briefly described.

The resin case 3 shown in FIG. 1 is configured by integrally connecting two divided case members on the front side and the back side of the sheet of FIG. 1 by means of metal clips or screws. As shown in FIG. 4, a guide groove 33 having a sectionally elongated shape is formed on the inner wall of each case member of the case 3 so as to extend in the vertical direction of the case 3. Although the single guide groove 33 located on the back side of the sheet of FIG. 1 is shown in FIG. 4, two guide grooves 33 are actually provided at opposed positions on the inner walls of the two divided case members of the case 3.

Each guide groove 33 extends in a direction substantially perpendicular to the direction of air flow in the case 3 and parallel to the plane of the opening 8 for cool air and the opening 9 for heating. Further, each guide groove 33 is formed at a position just upstream from the cooler opening 8 and the heater opening 9 in the vicinity of these openings 8 and 9.

The holding portions 32 of the support member 21 at one lateral end are inserted into the guide groove 33 of one of the case members, and the holding portions 32 of the support member 21 at the other lateral end are similarly inserted into the guide groove 33 of the other case member. Then, the support member 21 is accommodated into the case 3 in such a manner as to be held between the two case members, and is supported slidably along the guide grooves 33.

In this accommodated condition, the one plane portion 21a of the support member 21 extends in a direction substantially perpendicular to the direction of air flow in the case 3 (i.e., in a direction crossing the air flow), and the support member 21 is movable along the guide grooves 33. Accordingly, the support member 21 is constantly movable in the direction of extension of the one plane portion 21a. As shown in FIG. 4, the mounting portions 25a and 25b are formed at the opposite ends of the support member 21 with respect to the moving direction thereof.

Now, the link mechanism 14 will be described in detail with reference to FIG. 4.

The link mechanism 14 has a drive shaft 37 pivotably supported at its opposite ends to the case 3. The drive shaft 37 is made of a resin material such as polypropylene. The drive shaft 37 is so located as to extend horizontally (in the lateral direction of the vehicle) at the air mixing chamber portion 13 in the case 3. The drive shaft 37 is integrally formed with an air guide plate 34 for adjusting the direction of air flow at the air mixing chamber portion 13 in the case 3, and also formed with a lever member 35. The lever member 35 is connected at its one end to the drive shaft 37, and extends from this connected portion with the drive shaft 37 toward the lever member 23 of the support member 21.

The lever member 35 is formed at a substantially central position in the axial direction of the drive shaft 37. The other end of the lever member 35 is integrally formed with a columnar engaging portion (pin) 36. The engaging portion 36 is loosely engaged with the U-shaped recess 23a of the lever member 23 of the support member 21. Accordingly, the lever member 35 is pivotably engaged at its other end with the recess 23a of the lever member 23 of the support member 21.

Figure 5:
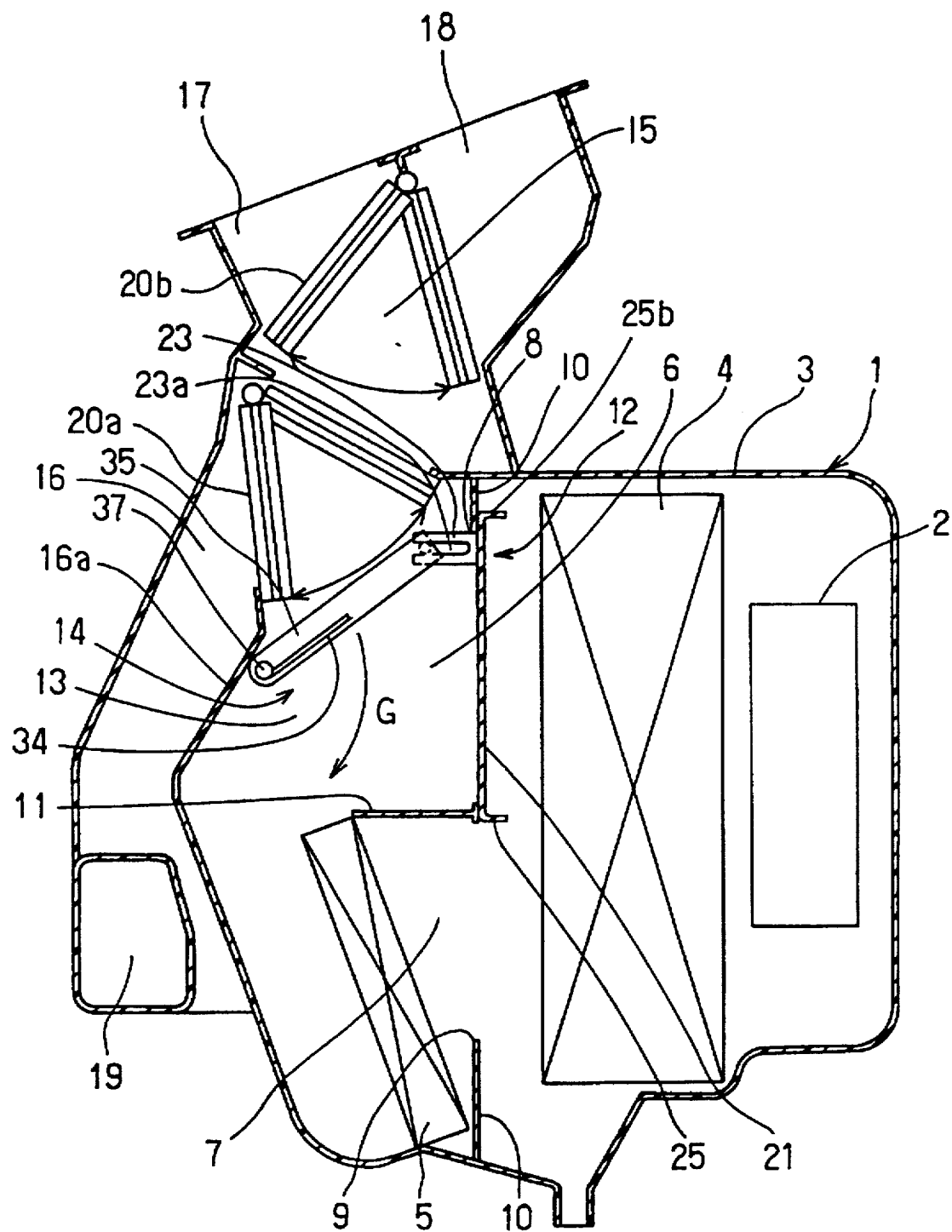
FIG. 5 is a cross-sectional view of the general construction of the first embodiment of the present invention in a maximum hot mode.
Figure 8:
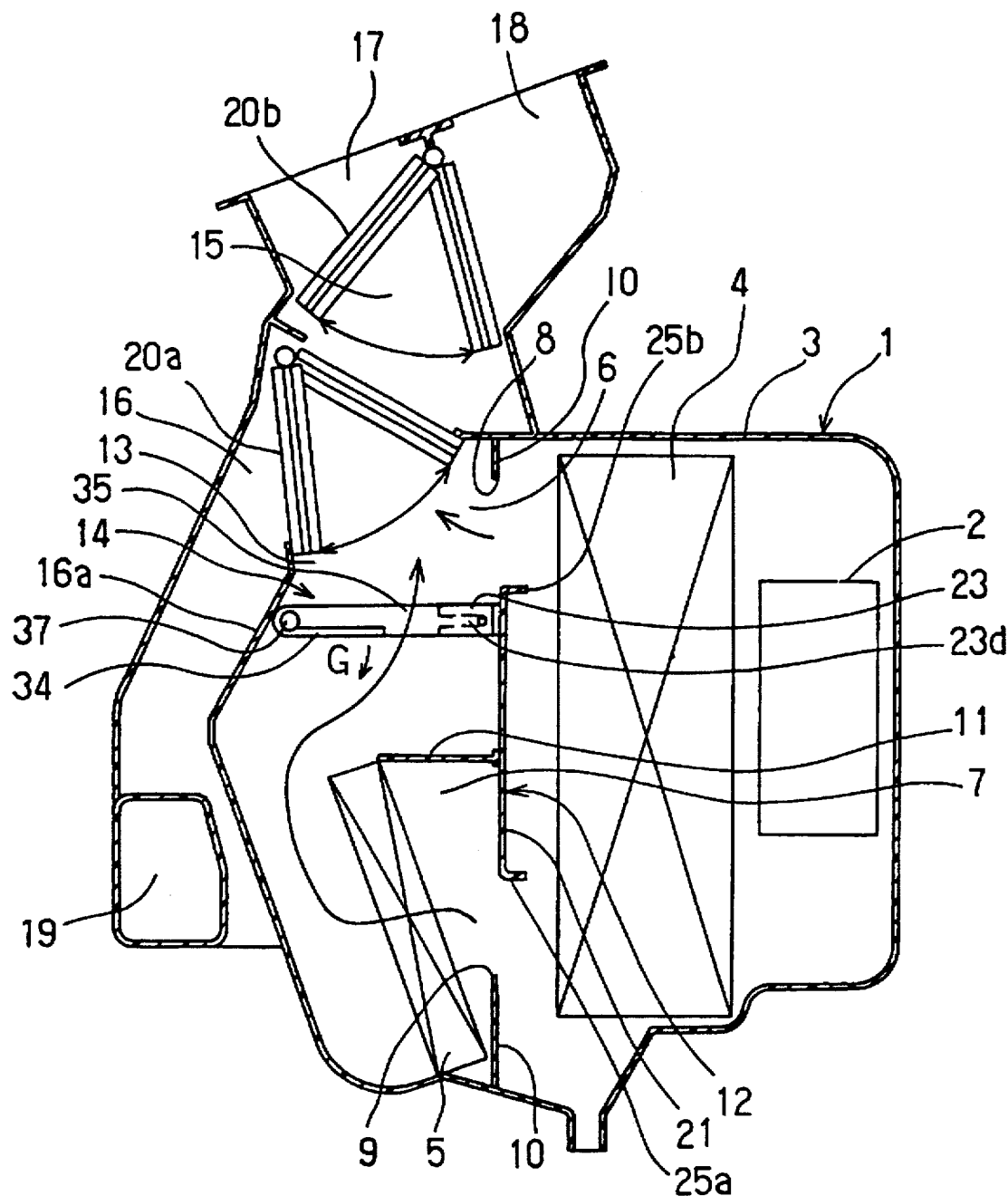
FIG. 8 is a cross-sectional view of the general construction of the first embodiment of the present invention in an air mixing mode.

The relation of engagement between the lever member 35 of the link mechanism 14 and the lever member 23 of the support member 21 is set in the following manner. In a maximum cooling region as shown in FIG. 1 and a maximum heating region as shown in FIG. 5, the lever members 23 and 35 are engaged together in a bent condition as shown in FIGS. 1 and 5. In contrast, in an intermediate temperature control region as shown in FIG. 8, the lever members 23 and 35 are engaged together in a substantially straight condition.

One end (not shown in FIG. 4) of the drive shaft 37 does not project outside of the case 3 and is pivotably supported to the wall surface of the case 3, but the other end of the drive shaft 37 does projected outside of the case 3 and is connected to a drive lever 27 as driving means for driving the drive shaft 37.

The air guide plate 34 is a rectangular plate-like member elongated along the axial direction of the drive shaft 37. The air guide plate 34 is rotated together with the drive shaft 37 to change its rotational position.

In this way, the air guide plate 34 and the lever member 35 are rotated together about the axis of the drive shaft 37 along with the rotation of the drive shaft 37. Accordingly, the position of the engaging portion 36 of the lever member 35 is moved vertically as viewed in FIG. 4. This vertical movement of the engaging portion 36 is transmitted via the lever member 23 to the support member 21, thereby moving the support member 21 along the guide grooves 33 in the vertical direction as viewed in FIG. 4 (in the direction substantially perpendicular to the direction of air flow in the case 3).

A driving mechanism for the drive lever 27 may be a known structure. In this embodiment, the driving mechanism is configured as shown in FIG. 1 by providing a manually operable temperature control lever 41 on an air conditioning control panel 40 provided at an instrument panel in the passenger compartment, and connecting the temperature control lever 41 to the drive lever 27 via a control cable 42.

Accordingly, a manual operation force applied to the temperature control lever 41 is transmitted to the drive lever 27 via the control cable 42, thereby rotating the drive lever 27.

The above mechanism for rotating the drive lever 27 by using a manual operation force applied to the temperature control lever 41 via the control cable 42 may be replaced by another mechanism for rotating the drive lever 27 by using an actuator such as a servo motor adapted to be automatically controlled by an air conditioning control device.

An operation of this embodiment mentioned above will now be described. First, an operation in a maximum hot mode (maximum heating operation) as shown in FIG. 5 will be described.

In the operational condition shown in FIG. 5, the support member 21 and the film member 22 are in an uppermost operational position. In this operational position, the heater opening 9 is fully open and the cooler opening 8 is fully closed. As a result, the cool air passed through the evaporator 4 is wholly sent to the heater core 5. The shapes of the film member 22 in this condition are schematically shown in FIGS. 6 and 7.

Figure 6:
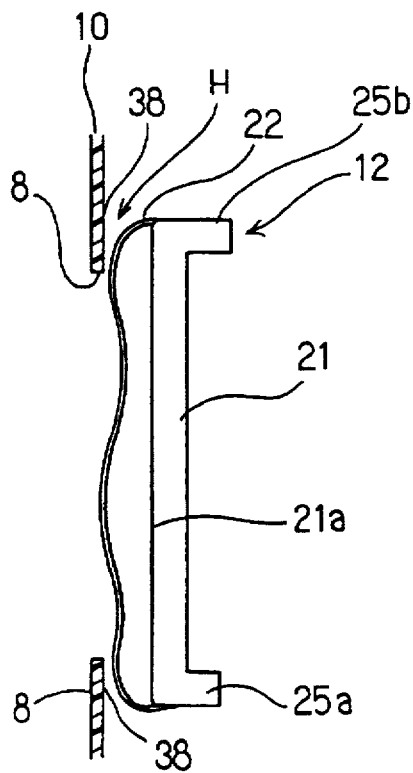
FIG. 6 is a partial structural view illustrating the condition of the film member when the blower is not operated in the first embodiment.
Figure 7:
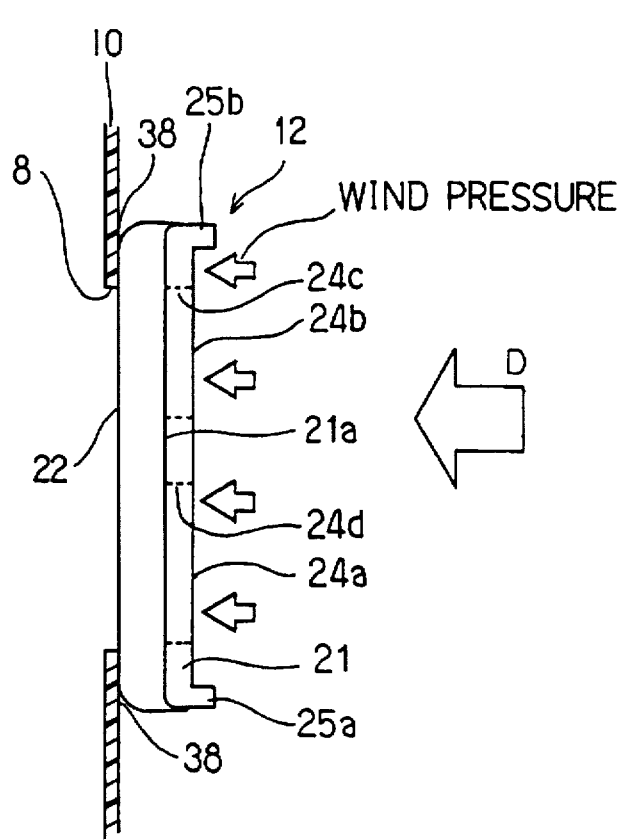
FIG. 7 is a partial structural view illustrating the condition of the film member when the blower is operated in the first embodiment.

FIG. 6 shows the shape of the film member 22 when the blower is not operated, and FIG. 7 shows the shape of the film member 22 when the blower is operated.

When the blower is not operated, the film member 22 maintains its natural shape as shown in FIG. 6, so that there is defined a slight gap between a peripheral portion 38 of the cooler opening 8 and the film member 22. To the contrary, when the blower is operated, the air passed through the evaporator 4 (as shown by the arrow "D" in FIG. 7) passes through the through holes 24a to 24d of the support member 21 to apply pressure on the inner surface of the film member 22 as shown in FIG. 7. Accordingly, the film member 22 is flexed so as to be expanded leftward as viewed in FIG. 7 by the above air pressure, and the entire periphery of the film member 22 comes into pressure contact with the peripheral portion 38 of the cooler opening 8.

As a result, the cooler opening 8 is certainly closed by the film member 22, thus improving the sealing effect in the closed condition.

Therefore, there is no possibility that the air may leak from the cooler opening 8 in the maximum hot mode, and the cool air passed through the evaporator 4 can be wholly introduced from the heater opening 9 into the heater passage 7.

Further, in the maximum hot mode, the air guide plate 34 of the link mechanism 14 has an operational position such that the opening area of the outlet of the heater passage 7 is maximized as shown in FIG. 5.

Next, an operation in an air mixing mode (intermediate temperature control operation ) where the cool air passed through the evaporator 4 is sent to both the cool air passage 6 and the passage 7 for heating by the sliding door 12 will be described with reference to FIG. 8.

In the air mixing mode as shown in FIG. 8, the support member 21 and the film member 22 are located at a substantially vertically intermediate position in the case 3 to adjust the ratio in opening area between the cooler opening 8 and the heater opening 9 and mix the air passed through the opening 8 for cool air with the air passed through the opening 9 for heating, thereby obtaining a desired temperature of conditioned air.

If the air introduced from the cooler opening 8 leaks from between the partition wall 11 and the film member 22 and enters the passage 7 for heating, there may be a problem that a desired mixing ratio cannot be obtained. Conversely, if the air introduced from the opening 9 for heating leaks from between the partition wall 11 and the film member 22 and enters the cool air passage 6, there may be a problem that a desired mixing ratio cannot be obtained.

In this embodiment, however, the air passed through the evaporator 4 blows against the film member 22 through the through holes 24a to 24d, thereby flexing the film member 22 so as to expand it toward the partition wall 11. Accordingly, the film member 22 is brought into pressure contact with the end surface of the partition wall 11 by the above air pressure, thus preventing the occurrence of the above problems.

Accordingly, the ratio in opening area between the cool air passage 6 and the heater passage 7 can be adjusted by the film member 22 to thereby obtain a desired temperature of conditioned air.

Further, when the maximum hot mode is shifted to the air mixing mode, the air guide plate 34 of the link mechanism 14 is rotated in the direction of the arrow "G" from the condition shown in FIG. 5 to the condition shown in FIG. 8. Accordingly, the opening area of the passage 7 for heating at its outlet is reduced by the air guide plate 34, and a portion of the passage 7 for heating in the vicinity of a partition wall 16a between the passage 16 and the passage 7 for heating is blocked by the air guide plate 34. As a result, the air passed through the heater passage 7 is changed in flow direction by the air guide plate 34 to flow between the film member 22 and the air guide plate 34 (see FIG. 8) into the cool air passage 6.

Accordingly, the warm air passed through between the film member 22 and the air guide plate 34 comes into collision with the cool air flowing in the cool air passage 6 in a direction perpendicular to or slightly opposite to the flow direction of the cool air, thereby facilitating the mixing of the cool air and the warm air and allowing the cool air and the warm air to be uniformly mixed in the air mixing chamber portion 13.

Next, an operation in a maximum cool mode (maximum cooling operation) will be described with reference to FIG. 1.

In the maximum cool mode shown in FIG. 1, the support member 21 and the film member 22 are in a lowermost operational position where the opening 9 for heating is fully closed and the opening 8 for cool air is fully open. Accordingly, the air passed through the evaporator 4 is wholly sent to the cool air passage 6.

The condition of the film member 22 in the maximum cool mode is similar to that in the maximum hot mode mentioned above, and the description thereof will therefore be omitted herein.

When the air mixing mode is shifted to the maximum cool mode, the air guide plate 34 of the link mechanism 14 is further rotated in the direction of the arrow "G" from the rotational position shown in FIG. 8 to the rotational position shown in FIG. 1 where the opening area of the heater passage 7 at its outlet is minimized. Although the air passed through the evaporator 4 does not flow in the heater passage 7 in the maximum cool mode, heat radiation from the heater core 5 (heat radiation by natural convection due to an engine cooling water constantly circulating in the heater core 5) causes a slight increase in temperature of the air in the passage 7 for heating, so that the warm air in the passage 7 for heating flows into the air mixing chamber portion 13 as shown by the arrow "K" in FIG. 1 and is mixed with the cool air, thus deteriorating the cooling performance.

In this embodiment, however, the air guide plate 34 in the maximum cool mode has the operational position shown in FIG. 1 to minimize the opening area of the outlet of the passage 7 for heating, and also serves as a block wall for suppressing the warm air due to heat radiation from the heater core 5 from flowing into the air mixing chamber portion 13. Thus, the deterioration in cooling performance due to heat radiation from the heater core 5 can be minimized.

Further, the air guide plate 34 is inclined upward on the left side thereof as viewed in FIG. 1 (i.e., the left side of the air guide plate 34 is raised to the downstream side of the air mixing chamber portion 13). Accordingly, the air guide plate 34 also serves as a block for blocking the flow of the air passed through the cool air passage 6 into the passage 7 for heating and a guide for guiding the cool air to either the passage 15 or 16.

As described above, the plate-like support member 21 and the film member 22 are movable in a direction parallel to the direction of extension of the plane of the support member 21 and substantially perpendicular to the flow direction of air in the case 3, thereby reducing the operation space for the support member 21 and the film member 22. That is, as compared with a conventional rotary air mixing door, the width of the sliding door 12 in the lateral direction as viewed in FIG. 1 (in the longitudinal direction of the vehicle) can be greatly shortened.

Further, since the link mechanism 14 for operating the support member 21 is located in the space leading from the cool air passage 6 to the air mixing chamber portion 13 in the case 3, the clearance "X" (FIG. 1) between the support member 21 and the evaporator 4 can be minimized as required. Further, since the link mechanism 14 is incorporated in the case 3, it is not necessary to secure a space for installing the link mechanism 14 outside the case 3.

As a result, the overall size of the air conditioner for the vehicle can be greatly reduced.

Further, since the film member 22 is flexed by the air pressure to come into pressure contact with the peripheral portion 38 of the opening 8 or 9 and the partition wall 11, the opening 8 or 9 can be reliably sealed by the film member 22. Further, since the sealing effect of the film member 22 is obtained by the air pressure, a force for operating the support member 21 can be greatly reduced as compared with the case where a packing mounted on the support member 21 slides in pressure contact with the peripheral portion 38 and the partition wall 11. Further, since the support member 21 and the film member 22 are moved in a direction substantially perpendicular to the flow direction of air in the case 3, there is no possibility of an increase in operating force applied to the sliding door 12 irrespective of the direction of movement of the sliding door 12.

Although the support member 21 is substantially perpendicular to the flow direction of air flowing in the case 3 in this embodiment, the support member 21 may be inclined at an angle to the flow direction of air provided that the film member 22 can be flexed by the air pressure in such an inclined condition. In addition, the film member 22 may be replaced by a packing or the like as a sealing member.

The above embodiment has the following feature with regard to temperature control characteristics.

As mentioned above, the lever member 35 of the link mechanism 14 and the lever member 23 of the support member 21 are engaged in the bent condition in the maximum cooling region shown in FIG. 1 and in the maximum heating region shown in FIG. 5, whereas these lever members 35 and 14 are engaged in the substantially straight condition in the intermediate temperature control region shown in FIG. 8.

Accordingly, in the maximum cooling region shown in FIG. 1 and in the maximum heating region shown in FIG. 5, the amount of movement of the lever member 23, that is, the amount of movement of the sliding door 12 in response to the amount of operation of the temperature control lever 41 (the amount of movement of the lever member 35) is substantially zero, so that the temperature of the blowing air can be maintained at a substantially constant value. In contrast, in the intermediate temperature control region shown in FIG. 8, the amount of movement of the lever member 23 linearly changes with the amount of operation of the temperature control lever 41 (the amount of movement of the lever member 35) in a one-to-one correspondence relationship, because the two lever members 23 and 35 are engaged together so as to extend substantially straight.

Figure 9:
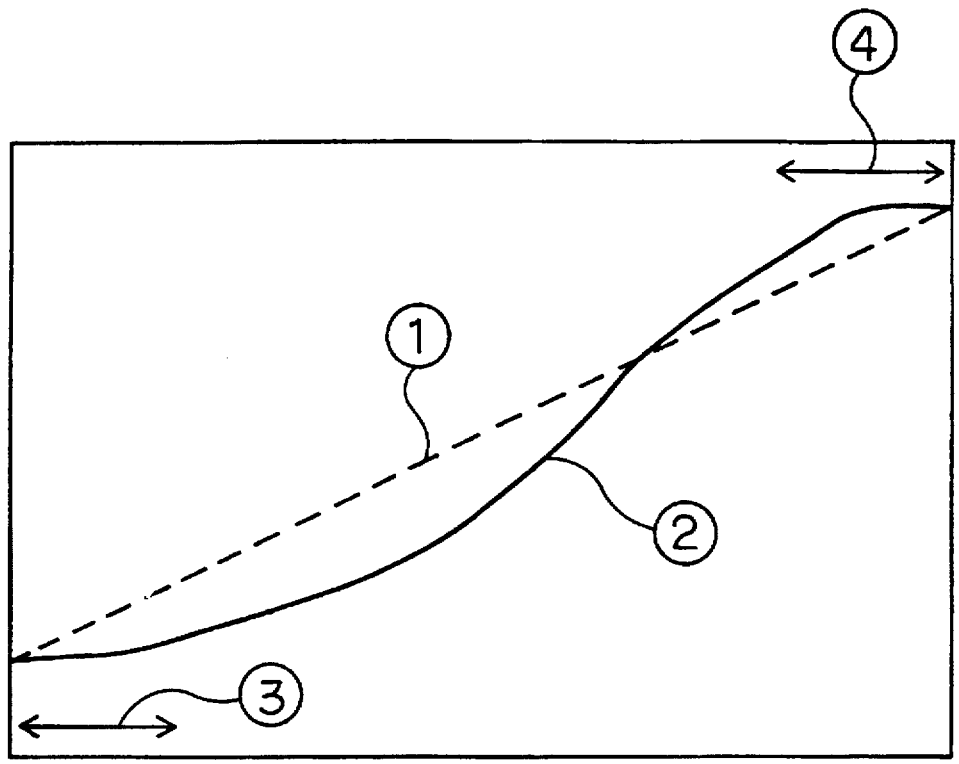
FIG. 9 is a graph showing a relationship between an amount of rotation of a lever member and a temperature of blowing air for the first embodiment and the comparison.

The temperature control characteristic according to this embodiment is shown by a solid line (2) in FIG. 9. This temperature control characteristic shown by the solid line (2) describes an S-shaped control pattern such that the temperature of the blowing air is substantially constant in the maximum cooling region having a predetermined range shown by a double headed arrow (3) and the maximum heating region having a predetermined range shown by a double headed arrow (4) based on the specific engaging relationship between the two lever members 23 and 35. According to this S-shaped control pattern, the temperature of the blowing air is constant irrespective of the change in operational amount of the temperature control lever 41 in the maximum cooling region (3) and the maximum heating region (4). Therefore, even if there are some variations in size of the link mechanism 14, the temperature control lever 41, the control cable 42, etc., the sliding door 12 can be reliably set to the maximum cooling position or the maximum heating position by the presence of the regions (3) and (4) each having the predetermined range when the temperature control lever 41 is operated to its maximum cooling position or its maximum heating position. Thus, a maximum cooling capacity and a maximum heating capacity can be reliably set.

Further, in the intermediate temperature control region, the amount of movement of the lever member 23 linearly changes with the amount of operation of the temperature control lever 41 (the amount of movement of the lever member 35) in one-to-one correspondence relationship, so that the temperature of the blowing air can be linearly changed, thereby controlling the temperature of the blowing air favorably.

Further, this embodiment may be modified with regard to temperature control characteristics as follows. In this modification, the shape of the guide grooves 33 is different from that in the previous embodiment.

Figure 10:
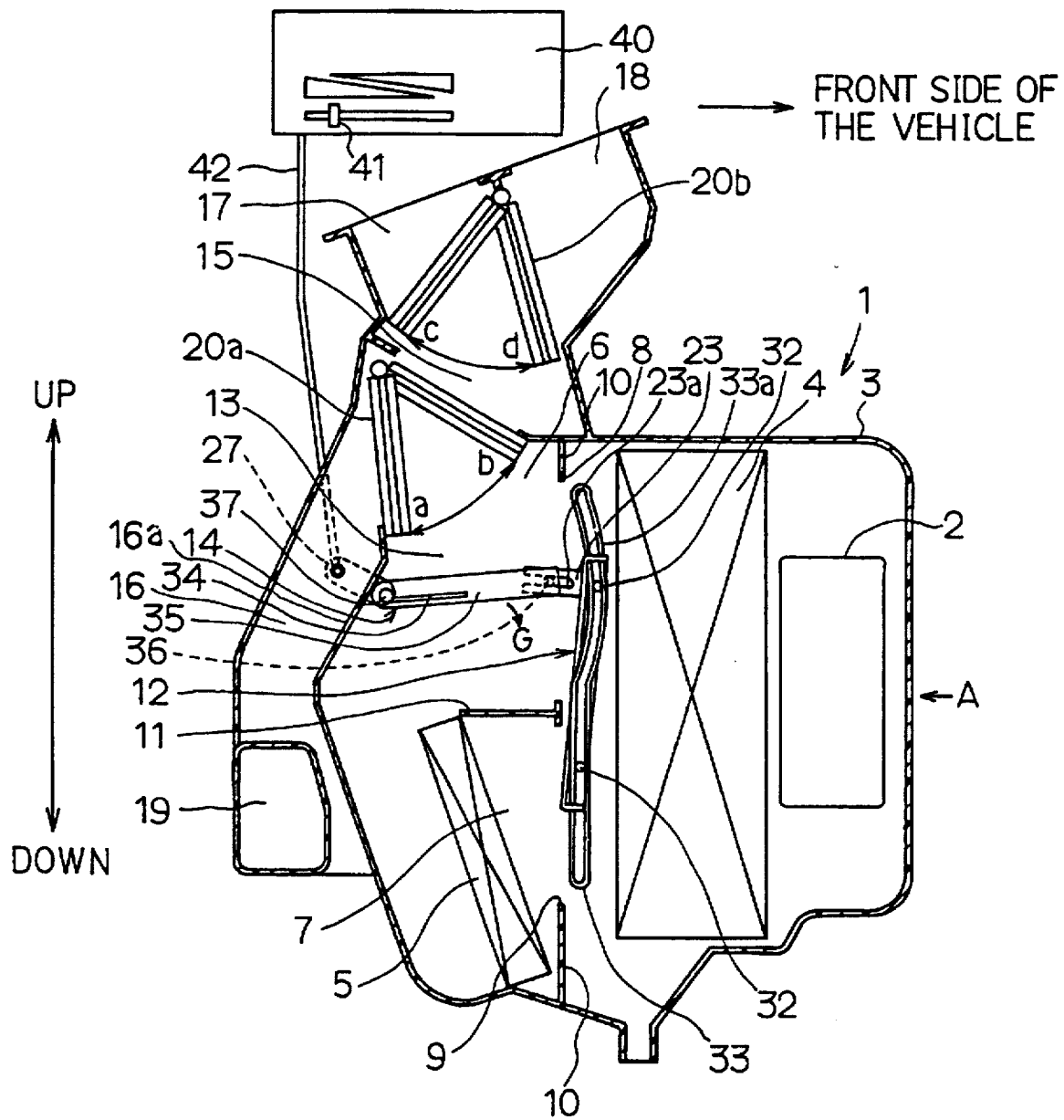
FIG. 10 is a cross-sectional view of the general construction of a modification of the first embodiment in the air mixing mode.

As shown in FIG. 10, each of the guide grooves 33 formed on the opposite side walls of the case 3 has an arcuate portion 33a curved toward the upstream side (toward the evaporator 4) in a region corresponding to the cool air passage 6. When the temperature control lever 41 is operated in the heating capacity decreasing direction from the maximum heating position, the amount of operation of the sliding door 12 in the cool air passage crossing direction is made smaller than the amount of operation of the engaging portion (pin) 36 of the link mechanism 14 in the cool air passage crossing direction (in the vertical direction as viewed in FIG. 10) by the arcuate portion 33a.

More specifically, the upper holding portions (pins) 32 of the sliding door 12 are engaged with the arcuate portions 33a of the guide grooves 33, which portions 33a are curved toward the upstream side (toward the evaporator 4). Accordingly, the direction of motion of the upper holding portions 32 is inclined toward the upstream side (toward the evaporator 4) in response to the amount of operation of the engaging portion (pin) 36 of the link mechanism 14 in the cool air passage crossing direction. As a result, the amount of operation of the sliding door 12 in the cool air passage crossing direction (in the vertical direction as viewed in FIG. 10) becomes smaller than the amount of operation of the engaging portion (pin) 36 of the link mechanism 14 in the cool air passage crossing direction.

Figure 11A:
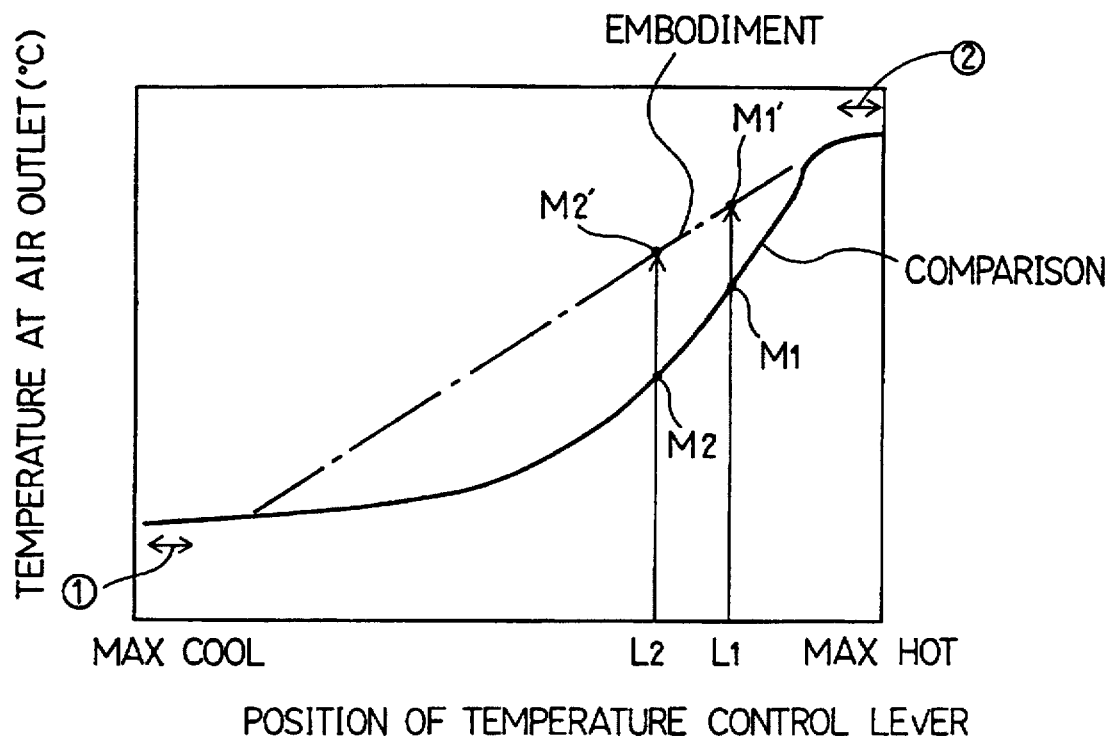
FIG. 11A is a graph showing a relationship between a position of a temperature control lever and a temperature of blowing air for the modification and the comparison.
Figure 11B:
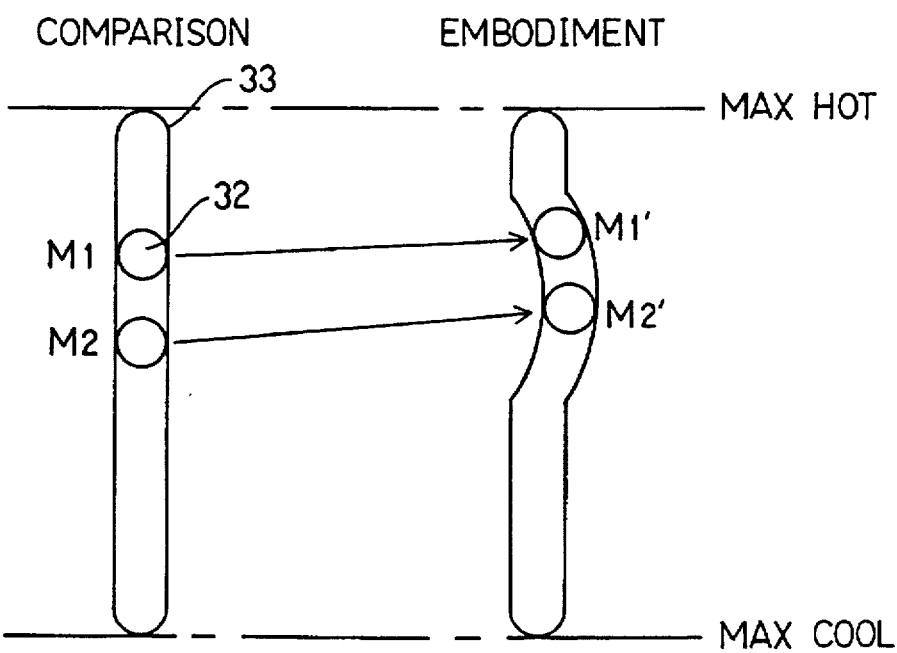
FIG. 11B is a view showing each guide groove for the modification and the comparison.

FIGS. 11A and 11B illustrate the effect obtained by providing the arcuate portion 33a in each guide groove 33. It is assumed that the temperature control lever 41 is operated in the heating capacity decreasing direction from the maximum heating position to reach the positions L1 and L2 shown in FIG. 11A. In comparison with the case where each guide groove 33 is straight, the upper holding portions (pins) 32 of the sliding door 12 are moved from the maximum hot position (the uppermost position) to the positions M1 and M2 respectively corresponding to the positions L1 and L2 as shown in FIG. 11B. As a result, the temperature of air blowing into the passenger compartment is largely decreased to the points M1 and M2 as shown in FIG. 11A. This large decrease in temperature is due to the fact that air flow resistance in the cool air passage 6 is sufficiently smaller than that in the passage 7 for heating as mentioned previously.

To the contrary, according to this modification, when the temperature control lever 41 is moved from the maximum hot position to the positions L1 and L2 in the heating capacity decreasing direction, the upper holding portions (pins) 32 of the sliding door 12 are moved merely to the positions M1' and M2' shown in FIG. 11b by the presence of the arcuate portions 33a of the guide grooves 33, and the amount of operation of the upper holding portions 32 in the cool air passage crossing direction in this modification becomes smaller than that in the above comparison.

As a result, when the temperature control lever 41 is moved in the heating capacity decreasing direction from the maximum heating position, a rapid decrease in the amount of warm air can be suppressed, and a decrease in temperature of the warm air blowing into the passenger compartment can be suppressed to the points M1' and M2' shown in FIG. 11A. Accordingly, it is possible to obtain a temperature control characteristic such that the blowing air temperature linearly changes with a change in operational position of the temperature control lever 41 as shown in FIG. 11A.

Accordingly, the control of temperature in the passenger compartment by the operation of the temperature control lever 41 can be easily performed.

Further, when the temperature control lever 41 is operated in the heating capacity decreasing direction from the maximum heating position, the sliding door 12 can be inclined toward the upstream side (toward the evaporator 4) by providing the arcuate portions 33a in the guide grooves 33. The inclination of the sliding door 12 thus obtained guides the air into the heater passage 7, thereby further increasing the amount of warm air and further improving the temperature control characteristic.

Figure 12:
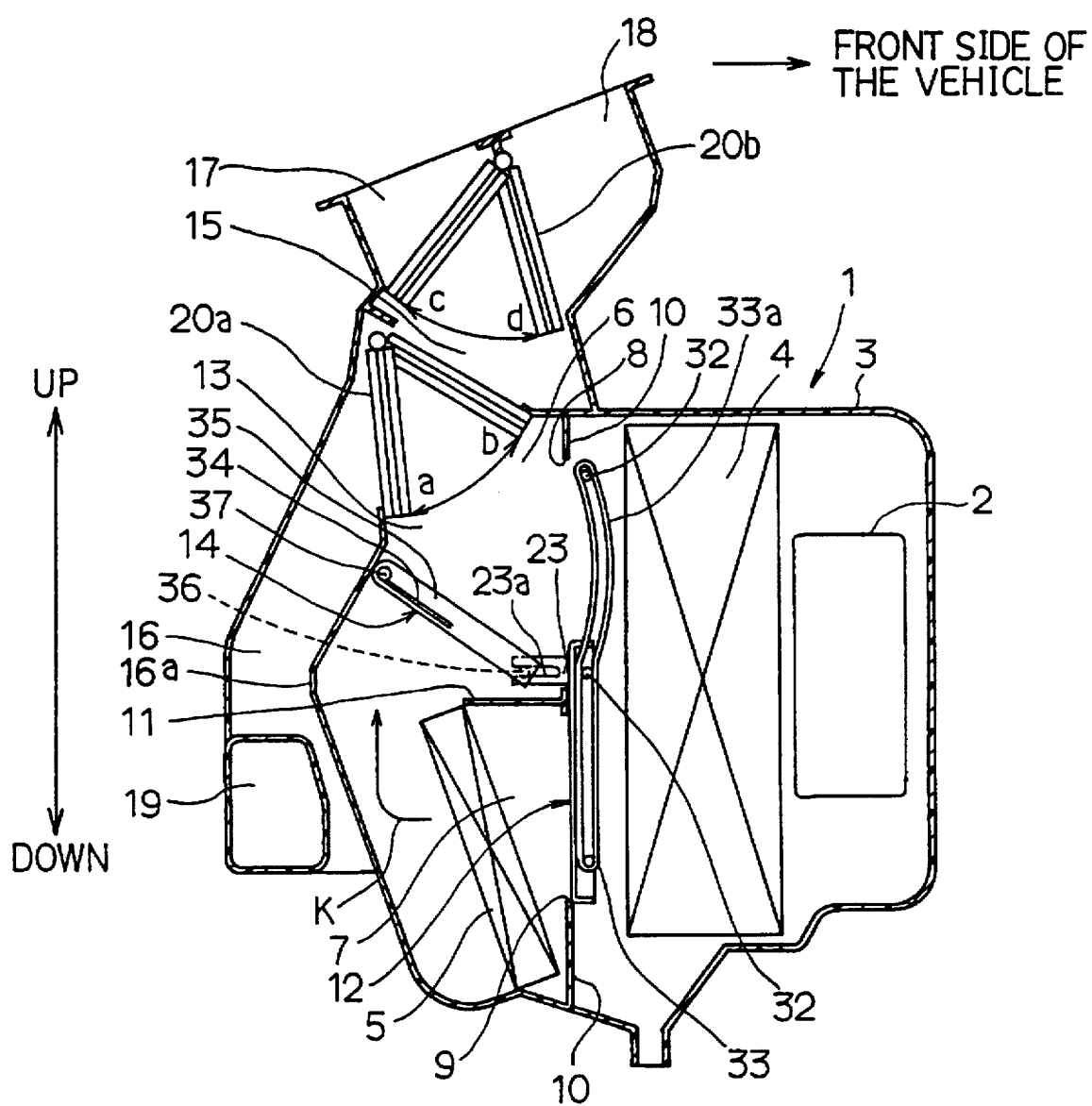
FIG. 12 is a cross-sectional view of the general construction of the modification of the present invention in an a maximum cool mode.
Figure 13:
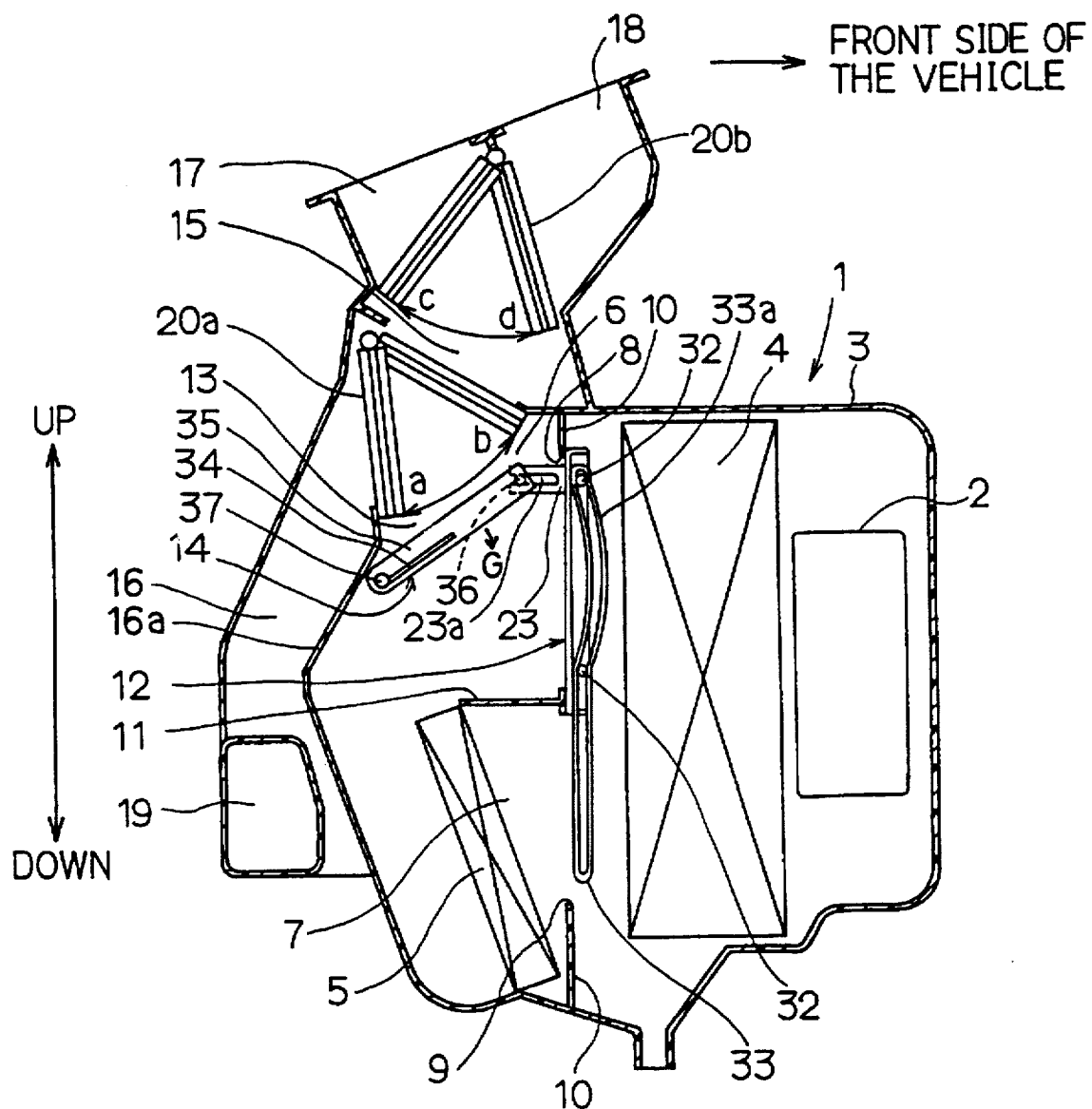
FIG. 13 is a partial structural view illustrating the condition of the film member when the blower is not operated in the modification.

Further, in the maximum cooling region as shown in FIG. 12 and in the maximum heating region as shown in FIG. 13, the lever member 35 of the link mechanism 14 and the lever member 23 of the support member 21 are engaged together in a bent condition as shown, whereas in the intermediate temperature control region as shown in FIG. 10, the two lever members 35 and 23 are engaged together in a substantially straight condition.

Accordingly, in the maximum cooling region shown in FIG. 12 and in the maximum heating region shown in FIG. 13, the amount of movement of the lever member 23, that is, the amount of movement of the sliding door 12, can be made substantially zero in response to the amount of operation of the temperature control lever 41 (the amount of movement of the lever member 35), thereby maintaining the temperature of the blowing air temperature at a substantially constant value. On the other hand, in the intermediate temperature control region shown in FIG. 10, the amount of movement of the lever member 23 linearly changes with a change in the amount of operation of the temperature control lever 41 (the amount of movement of the lever member 35) in a one-to-one correspondence relationship because the two lever members 23 and 35 are engaged in a substantially straight condition.

With this setting of the engaged condition between the two lever members 23 and 35, it is possible to obtain a temperature control pattern as shown in FIG. 11A such that the blowing air temperature is substantially constant in the maximum cooling region having a given range shown by a double headed arrow (1) and in the maximum heating region having a given range shown by a double headed arrow (2). According to this temperature control pattern, the temperature of the blowing air can be made substantially constant irrespective of the amount of operation of the temperature control lever 41 in the maximum cooling region (1) and the maximum heating region (2). Accordingly, even if there are some variations in size of the link mechanism 14, the temperature control lever 41, the control cable 42, etc., the sliding door 12 can be reliably set to the maximum cooling position (the full-closed position for the passage 7 for heating) or the maximum heating position (the full-closed position for the cool air passage 6) by the presence of the regions (1) and (2) each having a predetermined range.

Further, in the intermediate temperature control region, the amount of movement of the lever member 23 linearly changes with the amount of operation of the temperature control lever 41 (the amount of movement of the lever member 35) in a one-to-one correspondence relationship, thereby contributing to a linear change in the temperature of the blowing air.

Figure 14:
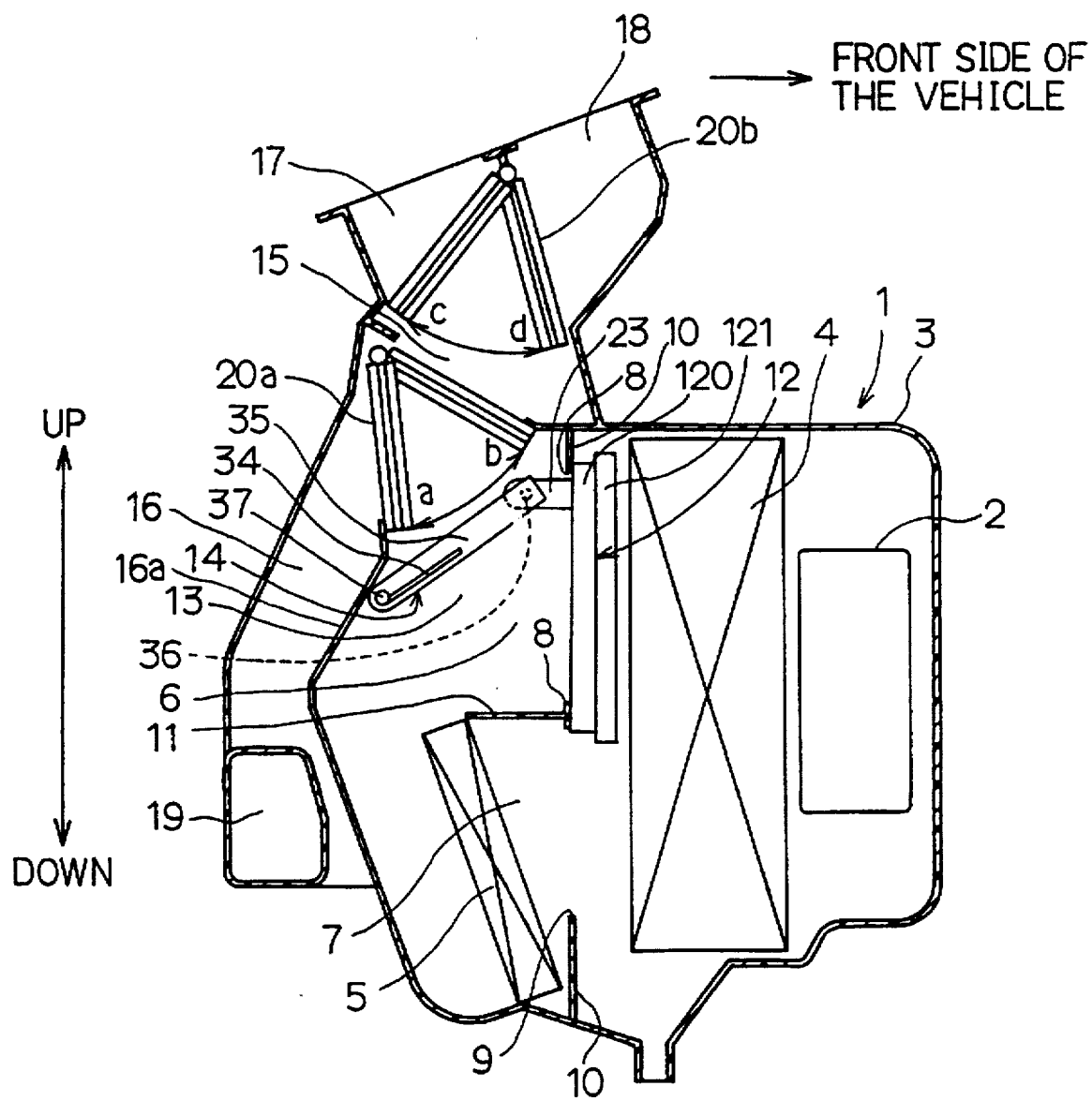
FIG. 14 is a cross-sectional view of the general construction of a second embodiment of the present invention in a maximum hot mode.
Figure 15:
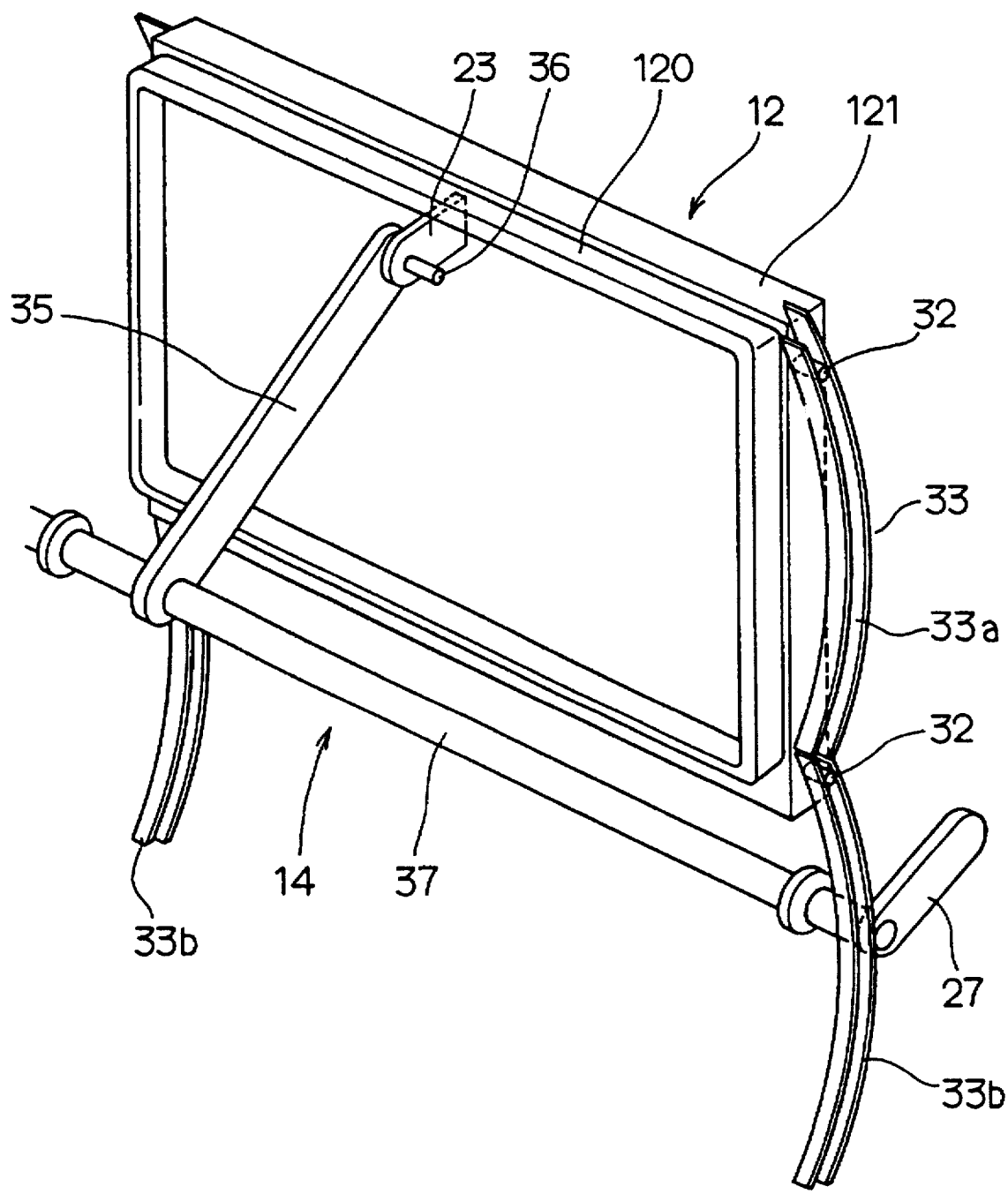
FIG. 15 is a perspective view illustrating the condition when the sliding door shown in FIG. 14 is installed and contained within a case.
Figure 16:
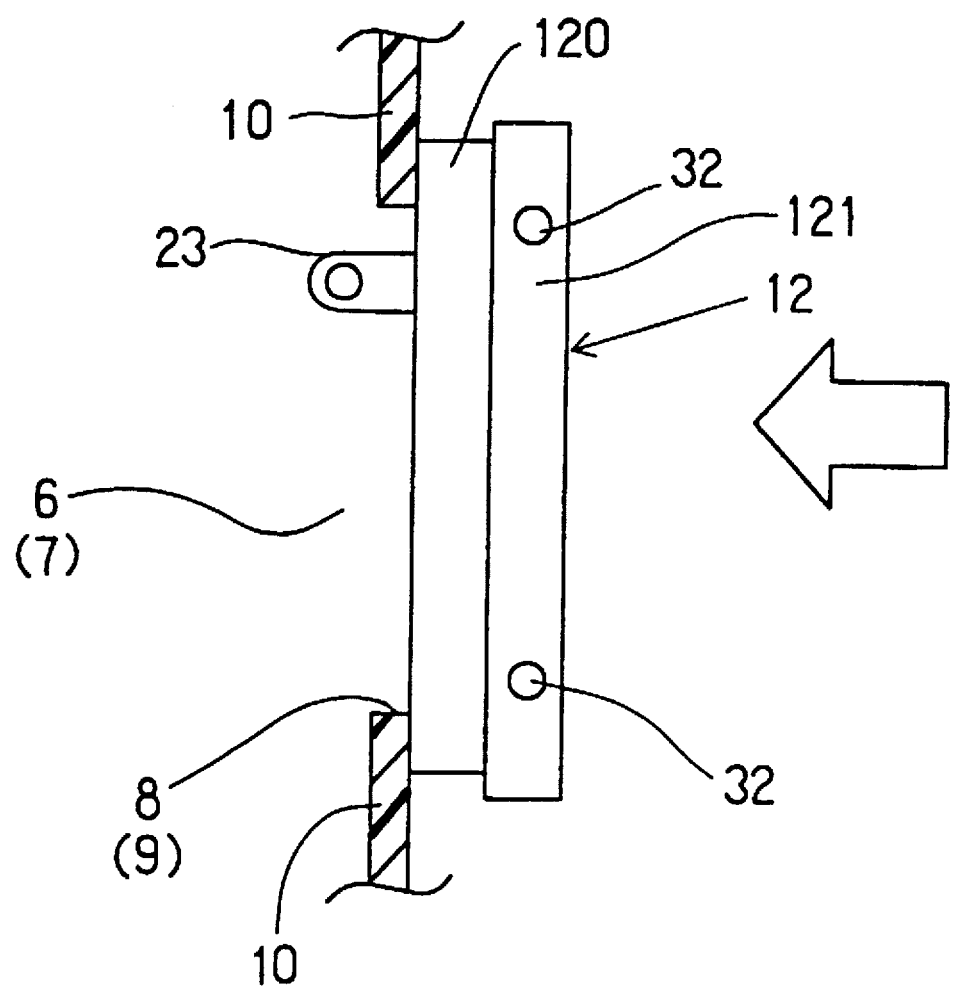
FIG. 16 is a partial cross-sectional view illustrating the condition when the sliding door shown in FIG. 14 is installed and contained within a case.

FIGS. 14 to 16 show a second embodiment of the present invention. In this embodiment, an elastic rubber packing 120 is employed instead of the film member 22 as the sealing structure of the sliding door 12.

As specifically shown in FIG. 15, the sliding door 12 generally includes a rectangular plate-like door body 121 having no opening and a hollow rectangular packing 120 fixed to the door body 121 at its outer peripheral portion by adhesion or the like. In the maximum hot mode (the maximum heating condition), the packing 120 is brought into pressure contact with the peripheral portion of the cooler opening 8 to obtain a sealing effect for fully closing the opening 8 for cool air.

In the maximum cool mode (the maximum cooling condition), the packing 120 is brought into pressure contact with the peripheral portion of the heater opening 9 to obtain a sealing effect for fully closing the heater opening 9.

However, if the packing 120 fixed to the door body 121 slides in pressure contact with the inner wall surface of the case 3, there is problem that a force for operating the sliding door 12 is greatly increased by the occurrence of sliding resistance of the packing 120.

To solve this problem, in this embodiment, there are an arcuate portion 33a of each guide groove 33 formed on the inner surface of the case 3 in a region corresponding to the cool air passage 6 so as to be curved toward the upstream side (toward the evaporator 4) and an arcuate portion 33b of each guide groove 33 in a region corresponding to the heater passage 7 so as to be curved toward the upstream side (toward the evaporator 4).

By providing the two arcuate portions 33a and 33b in each guide groove 33, the following effect can be obtained. That is, when the sliding door 12 is moved to any positions other than the maximum hot position and the maximum cool position, the upper and lower holding portions (pins) 32 of the door body 121 are guided in the arcuate portions 33a and 33b to arcuately move toward the upstream side, so that the packing 120 fixed to the downstream side surface of the door body 121 comes away from the inner wall surface of the case 3 at the peripheral portions of the opening 8 for cool air and the opening 9 for heating.

Accordingly, when the sliding door 12 is moved, sliding resistance of the packing 120 does not occur, thereby operating the sliding door 12 smoothly.

While the above embodiments employ the evaporator 4 provided in the air conditioning unit case 3, the present invention may of course be applied to an automotive air conditioner of such a type that the evaporator (cooler) 4 is not provided, but air supplied from the blower flows directly into the heater core (heater) 5 and the cool air passage 6. The maximum cooling condition in this type of automotive air conditioner means a condition where the whole amount of the air supplied from the blower passes through the cool air passage 6 without being heated by the heater core 5.

The present invention has been described in connection which what are presently considered to be the most practical preferred embodiments. However, the invention is not meant to be limited to the disclosed embodiments, but rather is intended to include all modifications and alternative arrangements included within the spirit and scope of the appended claims.

What is claimed is:

1. An air conditioner for an automobile having a passenger compartment, said air conditioner comprising:

a case having an air passage for introducing conditioned air to said passenger compartment;

a cooler, disposed in said air passage, for cooling air passing therethrough;

a heater, disposed on a downstream side of said cooler in said air passage, for heating air passing therethrough;

a warm air passage through which said heated air passes;

a cool air passage, bypassing said heater, through which said cooled air passes;

a cool air/warm air mixing chamber formed at a downstream side of said cool air passage and said warm air passage, for mixing said cool air passing through said cool air passage and warm air passing through said warm air passage;

a plurality of air outlet passages formed at a downstream side of said cool air/warm air mixing chamber, for introducing air passing through said cool air/warm air mixing chamber into said passenger compartment;

a sliding door, disposed at an upstream side of said heater, said sliding door being slidable in a crossing direction which is proximate to and substantially parallel to inlets of both said cool air passage and said warm air passage, for controlling a ratio between a volume of air flowing to said warm air passage and a volume of air flowing to said cool air passage; and a link mechanism connected to said sliding door, for operating said sliding door in said crossing direction, said link mechanism being disposed in a space leading from said cool air passage to said cool air/warm air mixing chamber, said link mechanism being disposed downstream of said sliding door.

2. An air conditioner according to claim 1, wherein said sliding door includes:

a support member having an opening;

a film member disposed on a downstream side surface of said support member to be movable together with said support member, said film member having flexibility; and a guide member for guiding said support member to move in said crossing direction;

wherein said film member is for receiving air pressure through said opening of said support member to thereby come into pressure contact with a peripheral portion of an opening portion of said warm air passage and a peripheral portion of an opening portion of said cool air passage.

3. An air conditioner according to claim 1, wherein said link mechanism includes:

a first lever member projecting said sliding door toward said cool air passage;

a drive shaft rotatably disposed in said cool air/warm air mixing chamber; and a second lever member having one end connected to said drive shaft and another end rotatably connected to said first lever member.

4. An air conditioner for an automobile having a passenger compartment, said air conditioner comprising:

a case having an air passage for introducing conditioned air to said passenger compartment;

a cooler, disposed in said air passage, for cooling air passing therethrough;

a heater, disposed on a downstream side of said cooler in said air passage, for heating air passing therethrough;

a warm air passage through which said heated air passes;

a cool air passage, through which cool air passes, formed in parallel with said warm passage;

a cool air/warm air mixing chamber formed at a downstream side of said cool air passage and said warm air passage, for mixing said cool air passing through said cool air passage and warm air passing through said warm air passage;

a plurality of air outlet passages formed at a downstream side of said cool air/warm air mixing chamber, for introducing air passing through said cool air/warm air mixing chamber into said passenger compartment;

a sliding door disposed at an upstream side of said heater, said sliding door being slidable in a crossing direction which is proximate to and substantially parallel to both said cool air passage and said warm air passage, for controlling a ratio between a volume of air flowing to said warm air passage and a volume of air flowing to said cool air passage;

a link mechanism, connected to said sliding door, for operating said sliding door in said crossing direction;

a temperature control mechanism for operating said link mechanism to control a predetermined cooling/heating capacity;

wherein said link mechanism includes:

a first lever disposed on said sliding door;

a drive shaft for being rotated by said temperature control mechanism; and a second lever member connected at one end thereof to said drive shaft;

said second lever member and said first lever member are engaged together so that an amount of movement of said first lever member is maintained to be substantially zero in response to an amount of movement of said second lever member in a maximum cooling region and a maximum heating region of said temperature control mechanism.

5. An air conditioner according to claim 4, wherein in said maximum cooling region and said maximum heating region of said temperature control mechanism, said first lever member and said second lever member are loosely engaged together in such a positional relation that said first lever member is bent from said second lever member, whereas in an intermediate temperature control region of said temperature control mechanism, said first lever member and said second lever member are loosely engaged together in such a positional relation that said first lever member extends substantially straight from said second lever member.

6. An air conditioner according to claim 5, wherein:

said first lever member has a U-shaped recess;

said second lever member is disposed at another end thereof with a pin; and said pin of said second lever member is loosely engaged with said recess of said first lever member.

* * * * *